Sept. 6, 1960

W. E. HOWALD 2,951,340

GAS TURBINE WITH CONTROL MECHANISM
FOR TURBINE COOLING AIR

Filed Jan. 3, 1956

*INVENTOR.*
WERNER E. HOWALD

BY *Victor A. Behn*

ATTORNEY

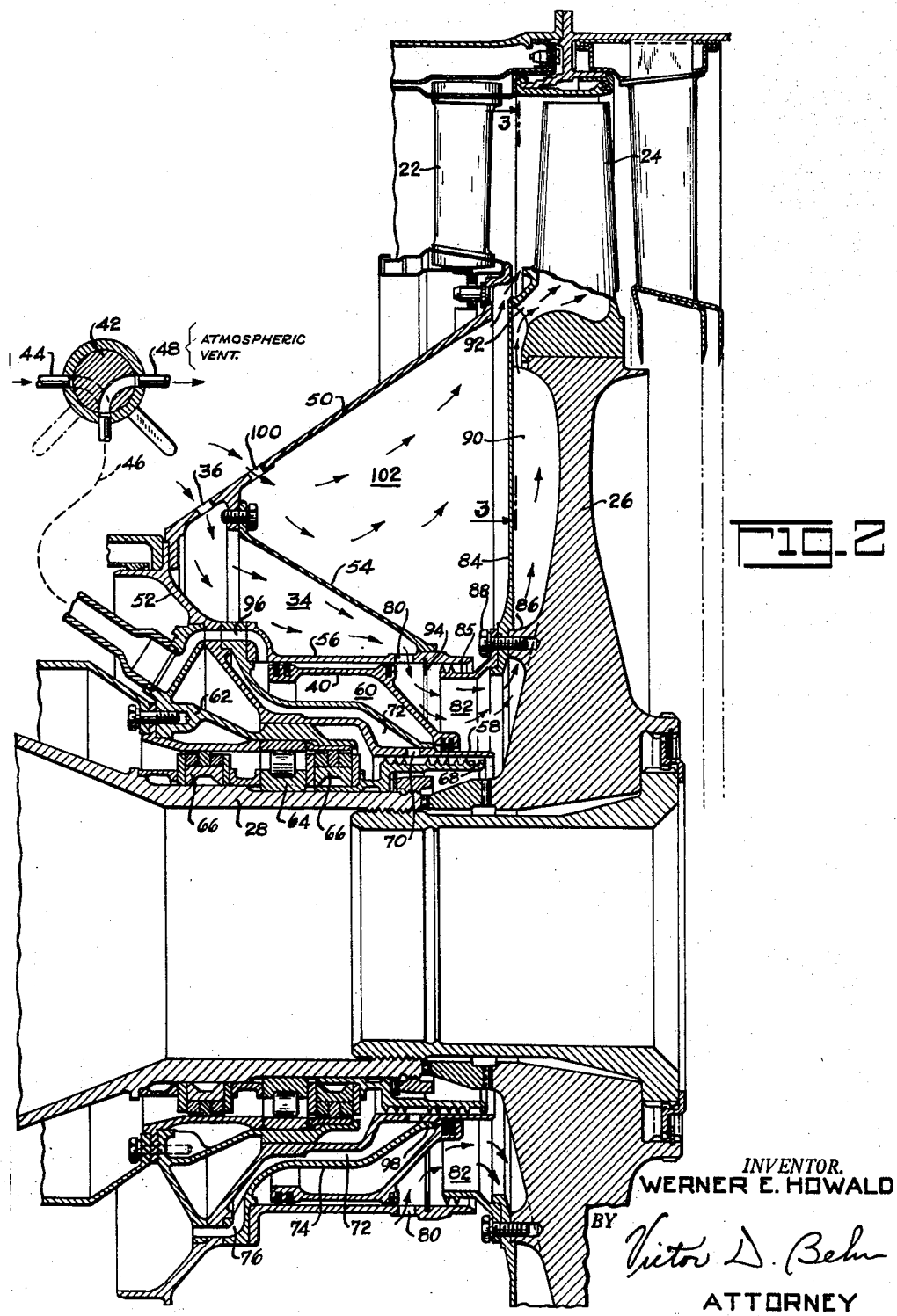

United States Patent Office 2,951,340
Patented Sept. 6, 1960

2,951,340
GAS TURBINE WITH CONTROL MECHANISM FOR TURBINE COOLING AIR

Werner E. Howald, Ridgewood, N.J., assignor to Curtiss-Wright Corporation, a corporation of Delaware Filed Jan. 3, 1956, Ser. No. 557,051

3 Claims. (Cl. 60—39.66)

This invention relates to gas turbine engines and is particularly directed to means for cooling the turbine rotors of such engines.

The power output and thermal efficiency of a gas turbine engine can be increased by increasing the temperature of the combustion gases supplied to the turbine blades. In general, however, any such increase is limited by the maximum permissible operating temperature of the turbine rotor and its blades. It is known to use a portion of the compressor air for cooling the turbine rotor and/or its blades. Any such use of the compressor air for turbine cooling decreases the amount of compressor air available for the combustion chamber of the gas turbine thereby decreasing the thermal efficiency of the engine. An object of the present invention comprises the provision of a novel and simple arrangement for controlling the flow of turbine cooling air such that said cooling air is only used when needed.

Other objects of the invention will become apparent upon reading the annexed detailed description in connection with the drawing in which:

Fig. 2 is an enlarged view of the turbine cooling air control mechanism of Fig. 1.

Figure 1:
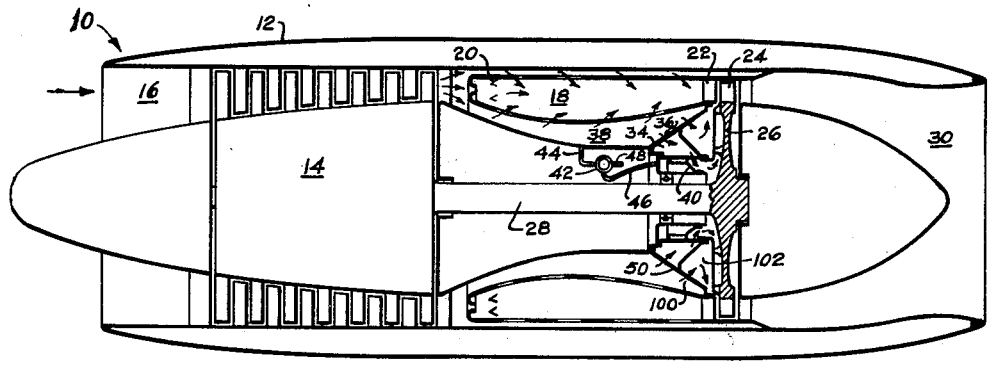
Fig. 1 is a diagrammatic view of a gas turbine engine embodying the invention.
Figure 3:
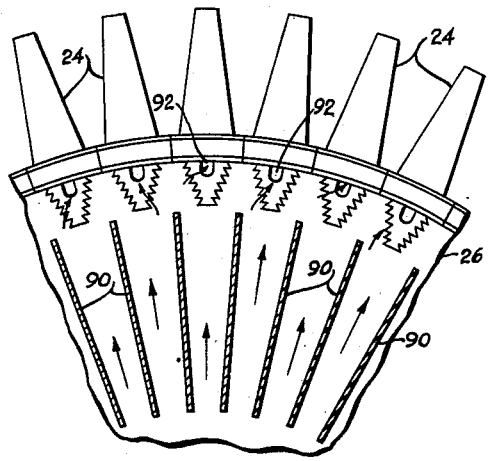
Fig. 3 is a view taken along line 3—3 of Fig. 2.

Referring to the drawing, a gas turbine engine is schematically illustrated at 10 as comprising a duct-like housing 12 having an air compressor 14 journaled within said housing adjacent to its forward end. The air compressor 14 receives air through an annular air inlet 16 and delivers compressed air to a combustion chamber 18. Within the combustion chamber 18 air is burned with fuel supplied for example through nozzles 20 and the resulting combustion gases are directed by a nozzle or guide vane structure 22 to the rotor blades 24 of a turbine rotor 26 for driving said rotor. A shaft 28 drivably connects the turbine rotor 26 with the air compressor 14. From the turbine blades 24 the exhaust gases discharge rearwardly into the surrounding atmosphere through an exhaust nozzle 30 whereby the gas turbine engine is provided with forward propulsive thrust. The gas turbine structure so far described is conventional.

In order to cool the turbine rotor air is bled off from the compressor delivery and supplied to the turbine 26. For this purpose an annular plenum type chamber 34 is provided, said chamber communicating with the compressor delivery through a restricted opening or openings 36. The restricted opening 36 connects the chamber 34 with an annular space 38 surrounding the combustion chamber 18, said annular space communicating directly with the compressor outlet and being provided to supply secondary air to the combustion chamber 18 through side openings in said chamber as illustrated in Fig. 1. A main air flow regulating valve 40 is provided for controlling the flow of air from the chamber 34 to the turbine 26 for cooling said turbine. A controllable auxiliary or servo valve 42 is also provided, said auxiliary valve having a first position for applying compressor delivery pressure from the secondary air space 38 through conduits 44 and 46 to one side of the main valve 40 for moving said main valve to its closed position. Said auxiliary valve 42 is movable to a second position in which said one side of the main valve 40 is vented through the conduit 46 and a vent conduit 48 so as to cause the main valve 40 to move to its open position as illustrated. The vent conduit 48 preferably opens into the atmosphere outside the engine 10.

Details of the main and auxiliary valves 40 and 42 and associated structure are best seen in Fig. 2. As illustrated, the cooling air chamber 34 is annular and is formed by a portion of the inner wall 50 of the secondary air space 38 and annular walls 52, 54 and 56. The wall 52 has an axially extending cylindrical portion 58 which together with the cylindrical wall 56 forms an annular cylindrical space 60 within which the valve 40 is slidable, said valve having an annular piston-type construction. The wall 52 together with a wall structure 62 forms a support for a bearing 64 within which the shaft 28 is journaled. Sealing means 66 are disposed on opposite sides of the bearing 64 and a labyrinth seal 68 is provided adjacent the turbine end of the shaft 28. The air supplied to the turbine for cooling purposes is hot as far as operating temperatures of the bearing 64 are concerned. Any such air or other gases leaking along the labyrinth seal 68 from the turbine are bled from the seal intermediate its ends through openings 70 in the cylindrical wall 58. From said openings 70 said hot gases bleed into an annular space 72 between said wall and an annular wall or partition member 74 and then escape through a passage 76 to the atmosphere thereby by-passing the bearing 64.

From the chamber 34 air for cooling the turbine is supplied through one or more openings 80 in the cylindrical wall 56 of said chamber to an annular space 82 at the hub of the disc of the turbine rotor 26. The annular space 82 is formed by a shroud 84 secured to the turbine rotor, said shroud having an inner portion 85 extending axially into sealing relation with the stationary cylindrical wall 56. The shroud 84 is secured to circumferentially-spaced bosses 86 on the turbine rotor by screws 88. The outer end of the shroud 84 abuts the rim of the turbine rotor. A plurality of circumferentially-spaced and radially-extending vanes 90 are secured to the shroud 84 and extend across the space between said shroud and the disc of the turbine rotor. The turbine rotor blades 24 are hollow for cooling air flow therethrough and the root end of each blade has an opening 92 communicating with the outer end of the space between the shroud 80 and the turbine rotor disc. Thus the vanes 90 form a centrifugal type pump for pumping cooling air from the annular space 82 at the hub of the turbine rotor radially outwardly over the turbine rotor disc and thence through openings 92 into the turbine rotor blades 24 and out through suitable openings in said blades.

At this point it should be noted that the invention is in no way limited to any specific turbine rotor structure for utilizing the cooling air supplied to the turbine rotor.

The valve 40 is slidable axially to the right (as viewed in Figs. 1 and 2) against a stop ring 94 to close the openings 80 thereby shutting off cooling air flow to the annular space 82 at the hub of the turbine. For this purpose the left end (as viewed in Figs. 1 and 2) of the cylindrical space 60 is connected to output passage 46 of the auxiliary valve 42 via a passage 96 through the wall structures 56, 74, 52 and 62. A shoulder 98 at the end of the wall 74 limits travel of the valve 40 in the opposite or valve opening direction.

With the aforedescribed structure, when the auxiliary valve 42 is in the full-line position illustrated the cylinder 60 is vented to the vent passage 48 whereupon the pressure in the space 82 on the downstream side of the valve 40 acts against the right hand end of said valve and is sufficient to move the valve 40 to the left to its open position against the stop 98 (as illustrated). In this open position of the valve 40 cooling air is supplied to the turbine through the valve openings 80 from the plenum chamber 34. The magnitude of the cooling air flow is limited by the restricted openings 36 through which the air is supplied to the plenum chamber 34.

When the auxiliary valve 42 is moved to its dot and dash line position compressor delivery pressure is supplied to the cylinder 60 and this pressure acts against the left hand end of the valve 40 to move the valve 40 to the right against the stop 94, the pressure in the annular space 82 on the downstream side of the valve 40 being less than said compressor delivery pressure. With the valve 40 disposed against the stop 94, said valve closes the valve openings 80 to shut off the cooling air flow to the turbine.

At this point it should be noted that the pressure in the chamber 82 although less than the discharge pressure of the compressor 14 is substantially above atmospheric even when the valve 40 is fully closed. Accordingly, with the valve 40 closed the pressure in the chamber 82 is sufficient to move the valve 40 to its open position when the pressure in the chamber 60 on the other side of the valve 40 is vented through the auxiliary valve 42. That this is so may be seen from the following considerations.

As described and illustrated, the engine 10 is a turbojet type aircraft engine. In such an engine the compressor is designed to provide a substantial pressure rise which in a typical engine may for example be as much as 10 atmospheres. After the combustion gases have expanded through the turbine 24 the pressure of the gases will still be several atmospheres above atmospheric pressure in order that said gases produce substantial forward thrust. This means that the turbine cooling air discharges into the engine motive fluid at a point where the pressure of said fluid is at least several atmospheres. With the valve 40 closed the pressure in the chamber 82 is equal to said cooling air discharge pressure less the pressure rise produced by the centrifugal pumping vanes 90. The provision of pumping vanes for the turbine cooling air, such as the vanes 90, is quite common merely to make up for the small friction losses in the flow path of said air from the compressor. Thus the pressure rise produced by the vanes 90 is small for example of the order of one atmosphere at normal turbine speeds. Hence, even with the valve 40 closed the pressure in the chamber 82 will be substantially above atmospheric presusre and therefore will be sufficient for moving the valve 40 from its closed to its open position.

The inner wall 50 of the secondary air space also has restricted openings 100 for supplying air under pressure to the annular space 102 between said wall and the turbine rotor. From the space 102 said air flows radially outwardly through the running clearance between the inner edge of the turbine guide vane structure and the adjacent rim edge of the turbine rotor thereby functioning as a seal to restrict leakage of hot combustion gases inwardly therebetween. Since the cooling air plenum chamber 34 and the space 102 each have their own restricted communication with the compressor delivery operation of the cooling air operation of the regulating valve 40 has no effect on the sealing function of the air supplied to the annular space 102.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In a gas turbine engine having a combustion chamber, an air compressor for supplying air to said combustion chamber and a turbine rotor arranged to be driven by combustion gases, said rotor being drivably connected to said compressor; the combustion therewith of means providing a passage for bleeding off air under pressure from said compressor to said turbine and thence into the flow path of the engine motive fluid adjacent to the turbine for cooling said turbine; a main valve for said bleed passage having an open position for flow of said bleed air through said passage and having a relatively closed second position, said valve having opposed first and second surface portions with said first portion being subjected to the pressure in said passage downstream of said valve for urging said valve toward one of its said positions; and an auxiliary valve selectively operable to apply the pressure of said compressor against said main valve second surface portion for causing said main valve to move toward the other of its said positions or to apply against said main valve second surface portion a pressure which is substantially lower than the pressure downstream of said main valve for causing said main valve to move toward said one of its said positions.

2. In a gas turbine engine having a combustion chamber, an air compressor for supplying air to said combustion chamber and a turbine rotor arranged to be driven by combustion gases, said rotor being drivably connected to said compressor; the combination therewith of means providing a passage including a chamber having restricted communication with said compressor for bleeding off air under pressure from said compressor to said turbine and thence into the flow path of the engine motive fluid for cooling said turbine; a main valve for said passage downstream of said chamber and having an open position for flow of said bleed air through said passage and having a second relatively closed position, said main valve having opposed first and second surface portions with said first surface portion being subjected to the pressure in said passage on the downstream side of said valve for urging said valve toward one of its said positions; and an auxiliary valve for controlling the pressure against said main valve second surface portion so that in one position of said auxiliary valve said second surface is subjected to air pressure obtained from said compressor for moving said main valve toward the other of its said positions and in another position of said auxiliary valve said second surface portion is subjected to a substantially lower pressure than the pressure downstream of said main valve such that the pressure on the downstream side of the main valve is effective to move said main valve toward said one of its said positions.

3. In a gas turbine engine having a combustion chamber, an air compressor for supplying air to said combustion chamber and a turbine rotor arranged to be driven by combustion gases, said rotor being drivably connected to said compressor; the combination therewith of means providing a passage including a chamber having restricted communication with said compressor for bleeding off air under pressure from said compressor to said turbine and thence into the flow path of the engine motive fluid adjacent to the turbine for cooling said turbine; a main valve for said passage downstream of said chamber and having an open position for flow of said bleed air through said passage and having a relatively closed second position, said main valve having first and second surface portions each subjected to a fluid pressure urging the valve in a direction opposite to the fluid pressure acting against the other surface portion with said first surface portion being subjected to the fluid pressure in said passage on the downstream side of said main valve for urging said valve toward its said open position; and an auxiliary valve selectively operable to apply compressor delivery air pressure against said main valve second surface portion for causing said main valve to move toward its said relatively closed position or to apply against said main valve second surface portion a pressure which is substantially lower than the pressure downstream of said main valve for causing said main valve to move toward its said open position.

References Cited in the file of this patent

UNITED STATES PATENTS

| | | |
|---|---|---|
| 2,490,913 | Lusignan | Dec. 13, 1949 |
| 2,656,096 | Schwarz | Oct. 20, 1953 |
| 2,664,916 | Conley | Jan. 5, 1954 |
| 2,811,833 | Broffitt | Nov. 5, 1957 |

FOREIGN PATENTS

| | | |
|---|---|---|
| 129,439 | Australia | Oct. 12, 1948 |
| 1,097,374 | France | Feb. 16, 1955 |
| 272,069 | Switzerland | Mar. 1, 1951 |